United States Patent [19]

Suzuki et al.

[11] Patent Number: 4,775,251
[45] Date of Patent: Oct. 4, 1988

[54] ELECTRONIC TYPEWRITER INCLUDING SPELLING DICTIONARY

[75] Inventors: Makoto Suzuki; Yasumichi Kojima; Hideo Ueno, all of Nagoya; Yasuhiro Hayashi, Toyoake; Satoshi Furukawa, Suzuka, all of Japan

[73] Assignee: Brother Kogyo Kabushiki Kaisha, Japan

[21] Appl. No.: 785,517

[22] Filed: Oct. 8, 1985

[30] Foreign Application Priority Data

Oct. 8, 1984 [JP] Japan ................. 59-211176
Oct. 16, 1984 [JP] Japan ................. 59-216765

[51] Int. Cl.⁴ ............................................. B41J 5/30
[52] U.S. Cl. ...................................... 400/63; 364/419; 364/518; 364/900; 382/40
[58] Field of Search .............. 400/61, 62, 63, 70, 400/74, 76, 83, 110, 712; 364/518, 900, 419; 382/40, 57

[56] References Cited

U.S. PATENT DOCUMENTS

| | | | |
|---|---|---|---|
| 3,780,846 | 12/1973 | Kolpek et al. | 400/62 X |
| 3,995,254 | 11/1976 | Rosenbaum | 382/40 X |
| 4,041,467 | 8/1977 | Cota et al. | 364/900 |
| 4,136,395 | 1/1979 | Kolpak et al. | 364/518 |
| 4,198,906 | 4/1980 | Fujikawa et al. | 400/74 X |
| 4,218,760 | 8/1980 | Levy | 364/900 |
| 4,323,315 | 4/1982 | Demonte | 400/63 |
| 4,328,561 | 5/1982 | Convis et al. | 400/63 X |
| 4,339,806 | 7/1982 | Yoshida | 400/63 X |
| 4,355,371 | 10/1982 | Convis et al. | 364/900 |
| 4,383,307 | 5/1983 | Gibson, III | 400/63 X |
| 4,408,302 | 10/1983 | Fessel et al. | 400/83 X |
| 4,413,318 | 11/1983 | Herrington | 364/200 |
| 4,420,817 | 12/1983 | Yoshida | 364/900 |
| 4,438,505 | 3/1984 | Yanagiuchi et al. | 364/900 |
| 4,439,836 | 3/1984 | Yoshida | 364/900 |
| 4,456,969 | 6/1984 | Herzik et al. | 364/900 |
| 4,467,446 | 8/1984 | Sakurai | 364/900 |
| 4,498,148 | 2/1985 | Glickman | 400/63 X |
| 4,499,553 | 2/1985 | Dickinson et al. | 364/900 |
| 4,502,128 | 2/1985 | Okajima et al. | 364/900 |
| 4,503,426 | 3/1985 | Mikulski | 340/711 |
| 4,503,514 | 3/1985 | Urquhart | 400/63 X |
| 4,548,520 | 10/1985 | Ueno | 400/63 |
| 4,559,598 | 12/1985 | Goldwasser et al. | 364/419 |
| 4,564,301 | 1/1986 | Ueno | 400/63 |
| 4,567,573 | 1/1986 | Hashimoto et al. | 364/900 |
| 4,580,241 | 4/1986 | Kucers | 400/63 X |
| 4,584,667 | 4/1986 | Hashimoto et al. | 364/900 |
| 4,590,560 | 5/1986 | Sado | 364/419 |
| 4,594,686 | 6/1986 | Yoshida | 364/419 X |
| 4,611,995 | 9/1986 | Sado | 434/157 |
| 4,651,300 | 3/1987 | Suzuki et al. | 364/900 |
| 4,655,620 | 4/1987 | Adams et al. | 364/900 X |
| 4,671,684 | 6/1987 | Kojima et al. | 400/63 |
| 4,689,768 | 8/1987 | Heard et al. | 400/63 X |

FOREIGN PATENT DOCUMENTS

| | | | |
|---|---|---|---|
| 57-41738 | 4/1982 | Japan . | |
| 0026280 | 2/1984 | Japan | 400/63 |
| 0009726 | 1/1986 | Japan | 364/419 |

OTHER PUBLICATIONS

I. H. Hernandez et al., "Interactive Spelling Correction Aid for a Text Processing System", IBM Technical Disclosure Bulletin, vol. 25, No. 8, Jan. 1983, pp. 4227–4228.

D. Wendel et al., "Using the on Mode", *CPT Spelling Checker I*, Mar. 1983, 4 pages.

"Eight Bit Character Excoding for Multiple Languages", V. A. Mayfield, *IBM Technical Disclosure Bulletin*, vol. 26, No. 2, p. 537, Jul., 1983.

(List continued on next page.)

*Primary Examiner*—Ernest T. Wright, Jr.
*Attorney, Agent, or Firm*—Parkhurst & Oliff

[57] ABSTRACT

The present electronic typewriter executes a spelling check control and, more specifically, judges whether or not a word in a dictionary memory identical to an inputted word exists. If a word does not exists, the word printing operation or sweep display of this word is automatically interrupted by a central processing unit. The present invention further provides an electronic typewriter wherein the operator is freed of the spelling check task and high-speed key-in operation can be achieved by preventing misspelled words from being printed.

11 Claims, 5 Drawing Sheets

OTHER PUBLICATIONS

IBM Technical Disclosure Bulletin, "Spelling Checking Typewriter", Hackett vol. 18, No. 2, Jul. 1975, pp. 530–531.

IBM Technical Disclosure Bulletin, "Spelling Processing Functions Operator Interface", Adam et al, vol. 24, No. 10, Mar. 1982, pp. 5003–5008.

IBM Technical Disclosure Bulletin, "Video Disc Dictionary System", Cohen et al, vol. 25, No. 8, Jan. 1983, p. 4209.

IBM Technical Disclosure Bulletin, "Method for Detecting and Correcting Selected Word Spelling Errors in a Text Processing System", Barker et al, vol. 25, No. 8, Jan. 1983, p. 4225.

ELECTRONIC TYPEWRITER INCLUDING SPELLING DICTIONARY

BACKGROUND OF THE INVENTION

1. Field of the Invention

The present invention generally relates to an electronic typewriter, and more specifically, to an electronic typewriter in which when a word is entered by input keys, a spelling check of the word is performed.

2. Description of Prior Art

Conventional electronic typewriters for words include a memory device for storing words and sentences entered by the various key operations and a display for successively displaying the entered words. In such typewriters, when an operator enters a word or line of a sentence, the entered word or line is printed by a printing device.

In such a conventional electronic typewriter, the operator must judge whether the spelling of the entered word is correct or not upon observation of the display. This impedes quick key-in operations.

Furthermore, a word processor equipped with a cathode ray tube (referred to as CRT) may be provided with an electronic dictionary which stores previously input word data. Such a word processor can judge whether the spelling of the entered word is correct or not by comparing every word of the entered sentences with the words stored in the electronic dictionary (referred to as spelling check functions). The entered sentences are displayed on the CRT. If there is a misspelled word in the displayed sentences, the misspelled word and words judged to be misspelled are distinguished from words whose spellings are correct by, for instance, blinking the misspelled word in a reverse display mode.

The conventional electronic typewriter described above, however, has no CRT, which can display all sentences contained in a single printing paper but has only a display for displaying characters or lines of sentences. Accordingly, if the spelling check is carried out in this electronic typewriter, the sentences to be displayed on the display need to be scrolled upward, downward, left or right by operating scroll keys to seek the misspelled words which have been displayed in the reverse mode, because the display can only display several characters or lines of the sentences. This is very inconvenient for an operator and is time-consuming in the spelling check mode. Due to the above disadvantages, such spelling check functions can hardly be provided in the conventional electronic typewriter effectively.

SUMMARY OF THE INVENTION

A primary object of the present invention is to provide an electronic typewriter wherein the spelling of the entered word is automatically judged through comparison means as to whether or not it exists in a dictionary memory, and if this comparison result shows that the entered word is not contained in the dictionary memory, the printing operation for this word is automatically interrupted by output control means, whereby an operator is freed of the spelling check task and high-speed key-in operation can be achieved by preventing the misspelled word from being printed out.

A secondary object of the present invention is to provide an electronic typewriter wherein, even if the display device can display only several characters or lines of sentences, the displayed words stored in the text memory are moved on the screen of the display in the spelling check mode, and when a misspelled word is found, the movement of the displayed words on the screen is interrupted while the misspelled word is displayed in a different mode from the correctly spelled words, whereby the misspelled word can be easily found and thus the spelling check can be simply effected without the scrolling key operation.

To accomplish these objects, an electronic typewriter is provided according to the invention comprising:

(a) a keyboard (2) for producing signals corresponding to depressed keys, the keyboard (2) comprising character keys (5) for entering character and other data and a space key (4) for separating the character and other data entered by the character keys (5) into words;

(b) a dictionary memory (15) for storing a plurality of word data corresponding to spellings of words;

(c) a working memory (16b) for storing said characters entered by the keys in single-word form;

(d) spelling check control means (14a) for comparing the spelling of the word with the word data, while reading out said word entered by the keys from the working memory (16b) and also the word data from the dictionary memory (15), thereby judging whether word data coincident with the spelling of the read word exists in said dictionary memory (15);

(e) a printer (12) for printing out said word on a print paper (13) in response to a depression of the space key (4); and (f) output control means (14b) for interrupting the judgment of the word data performed by said spelling check control means (14a) and also the printing out by said printer (12) if the spelling check control means (14a) judges that no word data coincident with the spelling of the word entered in the keyboard (2) exists in said dictionary memory (15).

Further, the electronic typewriter according to the invention further comprises:

(a) a keyboard (2) for generating signals corresponding to depressed keys, the keyboard (2) comprising character keys (5) for entering character and other data and a space key (4) for separating the character and other data entered by the character keys (5) into words;

(b) a dictionary memory (15) for storing a plurality of word data corresponding to spellings of words;

(c) a text memory (16a) for successively storing the words key-entered from the keyboard (2);

(d) readout means (14d) for successively reading out the words from the text memory (16a), (e) spelling check control means (14a) for comparing the spelling of the word read out by the readout means (14d) with the word data read out from the dictionary memory (15), thereby judging whether word data coincident with the spelling of the read data exists in said dictionary memory (15);

(f) a printer (12) for printing out the character data key-entered from the keyboard (2);

(g) a display means (10) for displaying the character data key-entered from the keyboard (2); and (h) output control means (14b) for interrupting the judgment of the word data performed by the spelling check control means (14a) in case that the spelling check control means (14a) judges that no word data exists coincident with the spelling of the word read out from the text memory (16a), and for displaying said word on the display means (10).

In addition, in accordance with the invention the output control means advantageously also comprises: movement displaying means (14g) for successively displaying with movement the word read out by the readout means (14d); and special displaying means (14i) for specially displaying a misspelled word under the control of the spelling check control means (14a) when the spelling check control means (14a) judges that there is no word data coincident with the spelling of the word.

Still further, in accordance with the invention the spelling check control means (14a) advantageously also comprises at least one of the following:

(a) correction means (14e) for operating the printer (12) to print out a word entered by the character keys (5) and the space key (4) while replacing the word recognized as the misspelled word when it is judged that no word data coincident with the spelling of the word entered from the keyboard (2) exists in the dictionary memory (15) by the spelling check control means (14a) in response to depression of a correction key (9) on the keyboard (2);

(b) pass means (14f) for releasing the printing interruption caused by the output control means (14b) in response to a depression of a pass key (7) on the keyboard (2) so as to recognize the word as the correctly spelled word, thereby printing out the word by the printer (12); and (c) designation means (14j) for designating whether or not the printing operation by the printing control means (12a) or the movement display by the movement displaying means (14g) is performed in conjunction with the word data judgment that no word data coincident with the spelling of the word entered from the keyboard (2) exists in the dictionary memory (15).

Also, in accordance with the invention the printer (12) comprises printing control means (12a) for successively printing out the words read out by the readout means (14d), and the printing control means (12a) comprises printing interruption means 12(b) for interrupting the printing operation when the printing control means (12a) judges that there is no word data coincident with the spelling of the word read out by the readout means (14d).

Further, in accordance with the invention the correction means (14e) advantageously also causes to be displayed on the display means (10) the word entered by the character keys (5) and the space key (4), and causes the word to be stored in the text memory (16a). Also, display interruption means (14h) advantageously are provided for interrupting a movement display of the word when the spelling check control means (14a) judges that there is no word data coincident with the spelling of the displayed word, and the pass means (14f) releases the movement display interruption caused by the display interruption means (14h) in response to a depression of a pass key (7) so as to recognize the word as the correctly spelled word, thereby continuing the movement display on the display means (10).

BRIEF DESCRIPTION OF DRAWINGS

These and other objects and features of the invention will become apparent with reference to the following specification and to the drawings, in which.

DETAILED DESCRIPTION OF PREFERRED EMBODIMENTS

Figure 1:
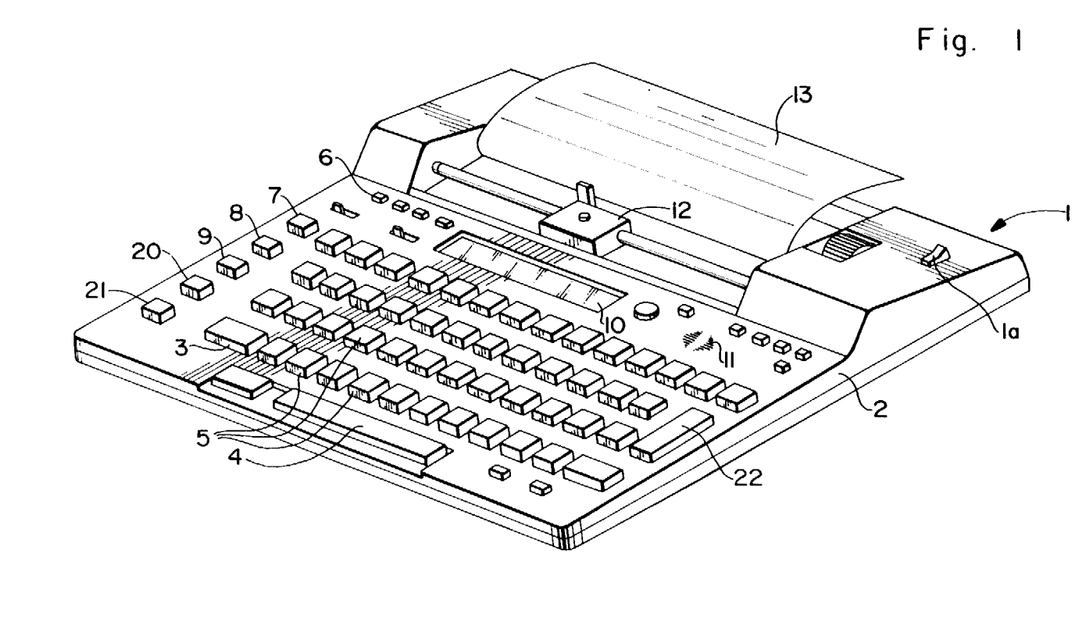
FIG. 1 is a perspective view of an electronic typewriter according to a first preferred embodiment of the invention.

Referring now to FIG. 1, an electronic typewriter according to one preferred embodiment of the present invention will be described and is generally designated 1. The electronic typewriter 1 comprises a keyboard 2 on which a shift key 3, a space key 4 as a separating key, a plurality of character keys 5 as input keys and other keys are mounted. When the character keys 5 are operated, various character data such as letters or numerals corresponding to the operated character keys are selectively entered into the electronic typewriter 1.

An expansion function key 6 is provided on the upper left portion of the keyboard 2. This function key 6 is used to perform the spelling check by the electronic typewriter 1. In the spelling check mode, spellings of words that have been entered by the character keys 5, space key 4 and so on are successively and automatically checked as they are entered. Below the expansion function key 6 a pass key 7 is provided by which to print out an uncorrected word which has been judged to be misspelled. A replace key 8 is provided under the pass key 7 to replace the word which has been judged as misspelled with a correctly spelled one. Under the replace key 8, a correction key 9 is provided to correct spellings of the misspelled words.

A pring key 20, a spelling check key 21 and the pass key 7 are provided on the left side of the keyboard 2, and a return key 22 is provided on the right side thereof. The print key 20 is utilized to execute printing of the characters, while the spelling check key 21 is used to check the spellings of the words which have been previously entered by the character keys 5. The pass key 7 is used to enter words recognized as misspellings without any correction. The return key 22 is used to shift lines of sentences.

At a central position of the back portion of the keyboard 2, a liquid crystal display 10 is provided as a display means. For example, words entered by the character keys 5 can be successively displayed up to a limit of twenty five characters on the liquid crystal display 10. Beside the display 10, a buzzer 11 is provided to indicate when the word entered by the character keys 5 is judged to be misspelled. A printer 12 is provided at the back side of the keyboard 2 to print out the words on a printing paper 13, which are entered by the character keys 5 and the space key 4.

Figure 2:
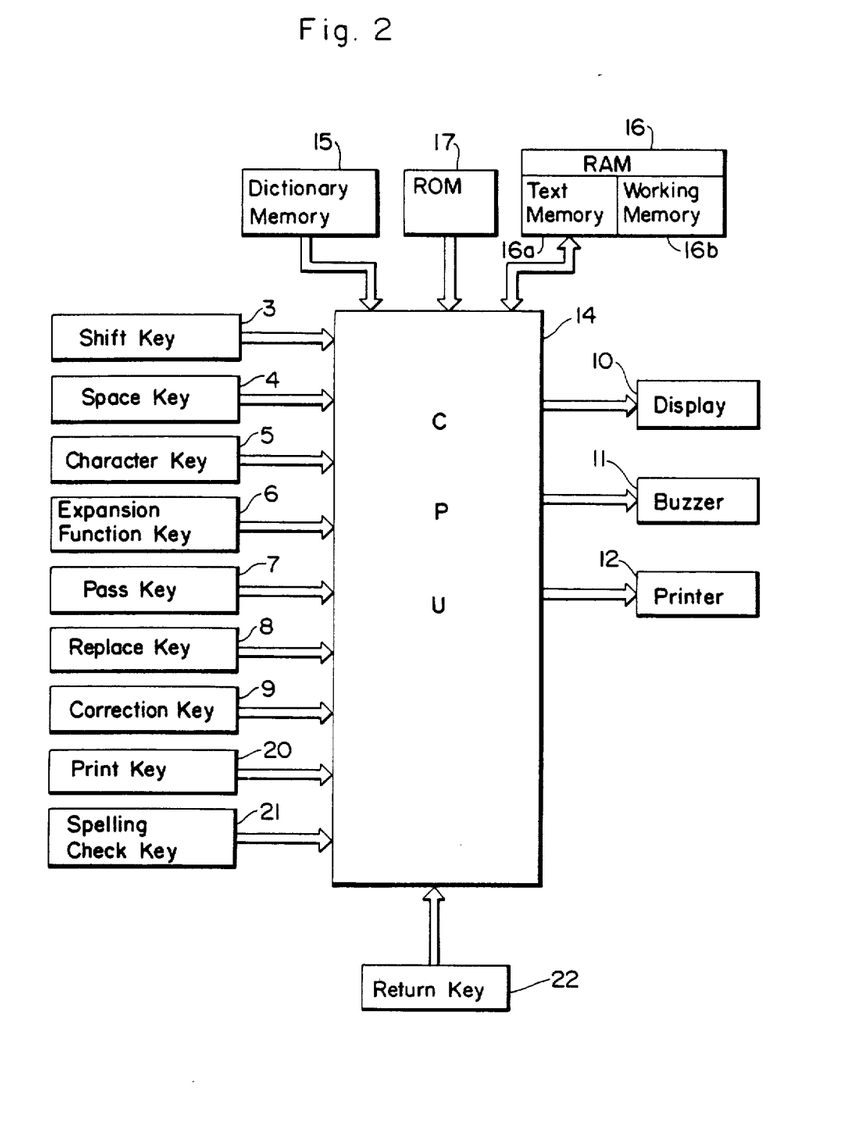
FIG. 2 is a schematic circuit diagram of the electronic typewriter shown in FIG. 1.
Figure 5:
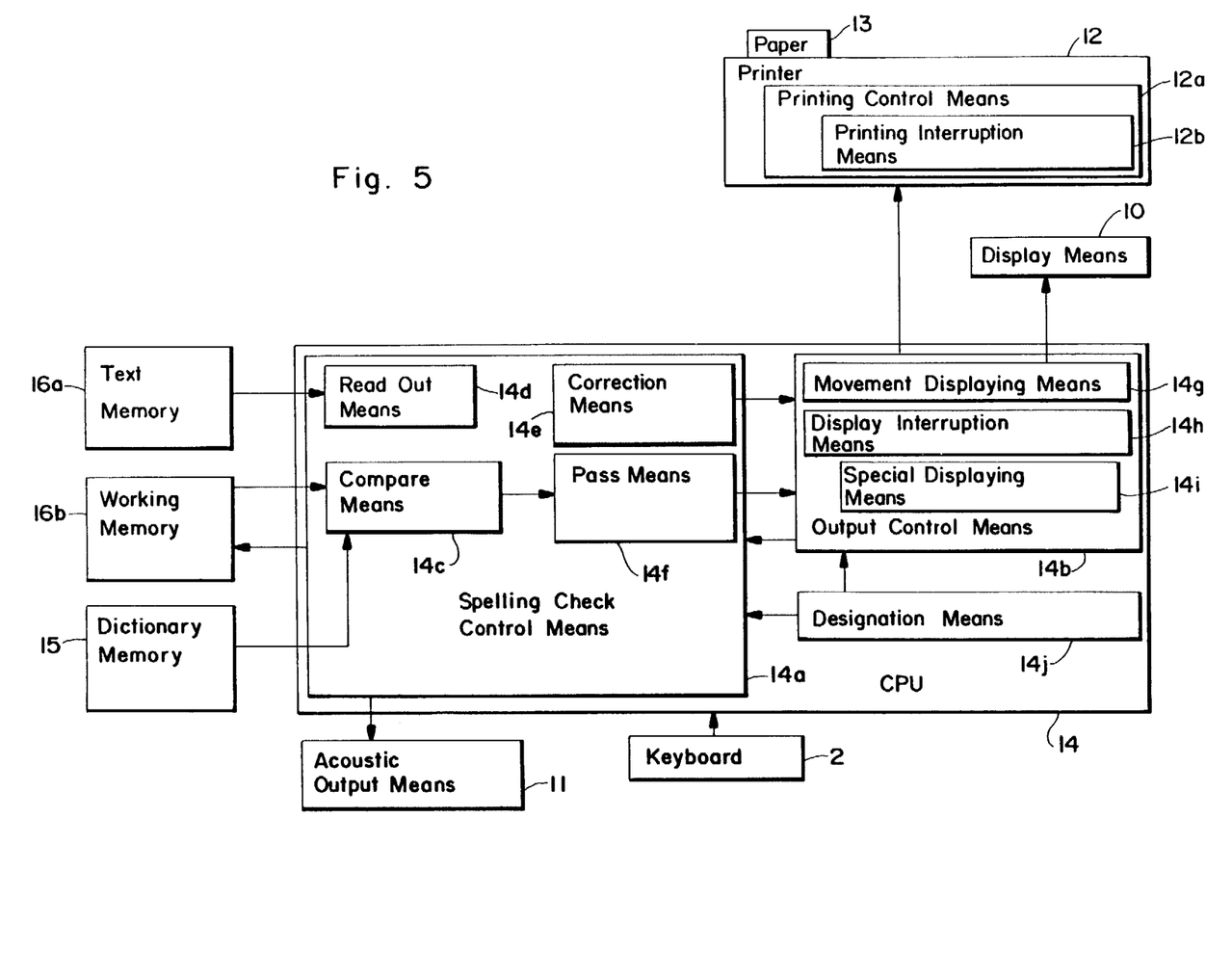
FIG. 5 is a block diagram showing added detail of some of the elements of FIG. 2.

A description will now be made of the electronic circuitry built in such an electronic typewriter 1 as constructed in accordance with the above explanation with reference FIGS. 2 and 5.

A central processing unit (referred to as "CPU") 14 controls a printing control means 12a, displays the characters on the display 10 based upon input signals produced by the character key depressions and recognizes a series of entered characters as a single word responsive to a depression of the space key 4 so as to print the word by the printer 12.

A dictionary memory 15 is a read only memory (ROM) having word data consisting of a plurality of words stored therein. A random access memory (RAM) 16 connected to the CPU 14 includes a text memory 16a and a working memory 16b, and the working memory 16b is adapted for storage of both the words entered by the character keys 5 and the space key 4, and the word data read out from the dictionary memory 15 under the control of CPU 14.

In the CPU 14, compare means 14c is activated by the expansion function key 6 and judges whether the word entered by the character keys 5 and the space key 4 coincides with the word data stored in the dictionary memory 15 by means of a program previously stored in ROM 17. In the output control means 14b, if there is no coincidence in the coparison result, the printing operation of the word by the printer 12 is interrupted.

That is, when the word is entered upon depression of the character keys 5 and the space key 4, the CPU 14 stores the word data of the entered word in the working memory 16b and this stored word is successively compared with the words, one by one, read from the dictionary memory 15 in which a plurality of words have been stored. When CPU 14 judges that there exists a word corresponding to the entered word in the dictionary memory 15, the entered word is printed out by the printer 12. When the CPU 14 judges that no word corresponding to the entered word is previously stored in the dictionary memory 15, the printing operation by the printer 12 is interrupted and simultaneously buzzer 11 is sounded. At the same time, a word analogous to the entered one is read out from the dictionary memory 15 and then displayed on the display 10 together with the word entered by the character keys 5 for preparing the subsequent key operation. Accordingly, CPU 14 selects from the dictionary memory 15 the word most closely corresponding to the entered word, and displays the selected word on the display 10.

CPU 14 instructs the printer 12 to directly print out the word entered by the character keys 5 when the pass key 7 is depressed under such a condition, and to print out the most closely corresponding word from the dictionary memory 15 when the replace key 8 is depressed, and further to print out the corrected word when the spelling of the entered word is corrected by use of the character keys 5 and the space key 4 after the correction key 9 is depressed.

Figure 3:
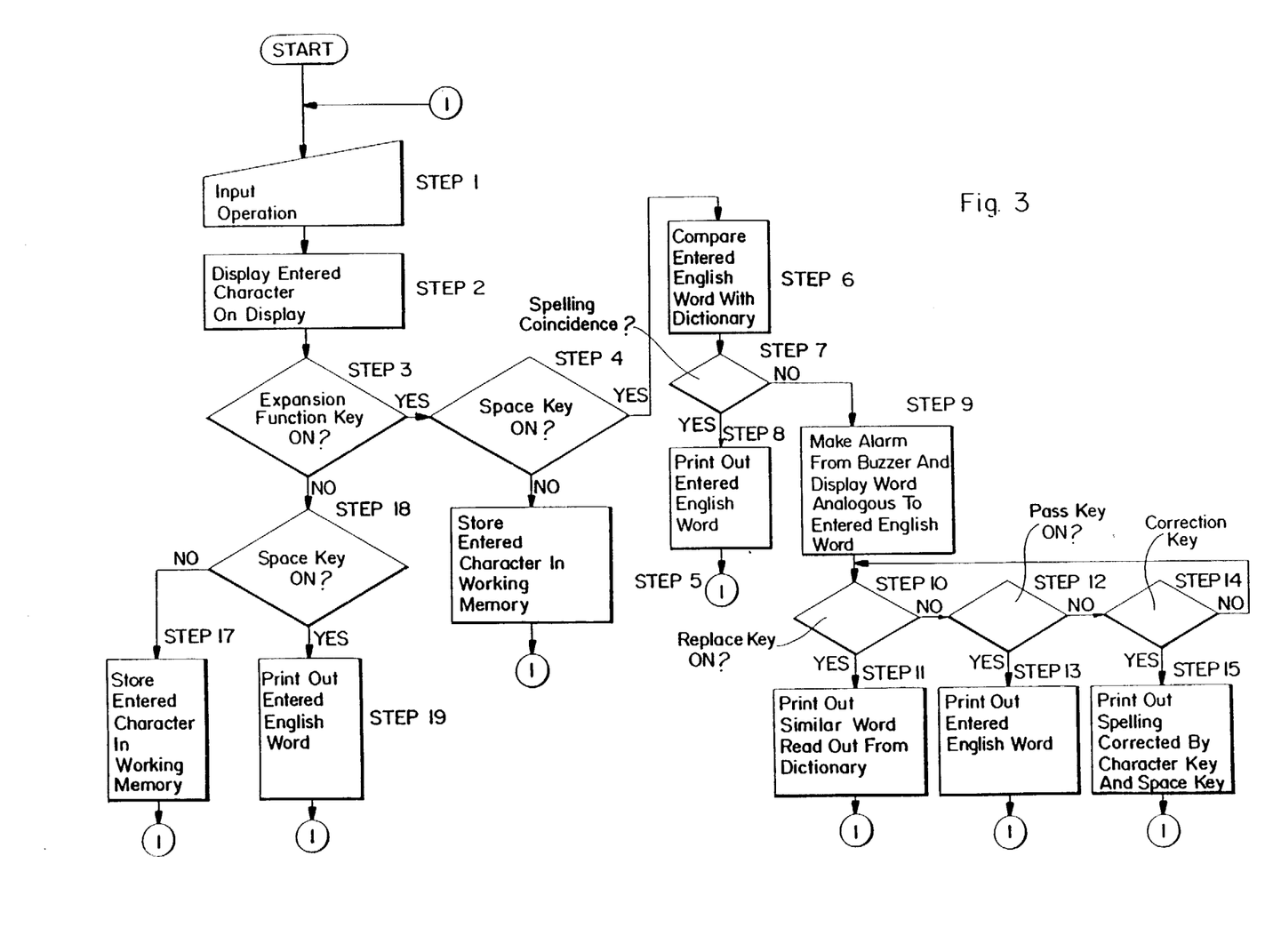
FIG. 3 is a flow chart of control operations of the electronic typewriter according to the first preferred embodiment.

The controlling operation of the electronic typewriter 1 as described above will now be described hereinunder based upon the flow chart shown in FIG. 3.

When a power switch 1a of the electronic typewriter 1 is turned on, CPU 14 is brought into a stand-by condition for subsequent key operations.

When the expansion function key 6 is depressed and thereafter the word is entered by the character keys 5 (in step 1), CPU 14 commands the display 10 to display the characters (in step 2). The CPU 14 also judges whether the expansion function key 6 is depressed or not (in step 3) and further whether the space key 4 is depressed or not (in step 4). If CPU 14 judges that the space key 4 is not yet depressed, the entered characters are stored in the working memory 16b and the CPU 14 then waits for the succeeding key operations (in step 5).

When the space key 4 is depressed after the characters have been entered by depressing the character keys 5, CPU 14 then recognizes the series of entered characters as a single word, and then compares this single word with the word data successively read out from the dictionary memory 15 so as to judge whether word data corresponding to the entered word exists in the plural sets of the word data stored in the dictionary memory 15 (in step 6). When there is a coincident word in the dictionary memory 15 (in step 7), CPU 14 enables the printer 12 to print out the entered word on the printing paper 13 (in step 8) and to wait for subsequent key operations.

If word data coincident with the entered word does not exist in the dictionary memory 15, the buzzer 11 sounds an alarm under the control of CPU 14 and simultaneously a word similar to the entered word is read out from the dictionary memory 15 and displayed on the display 10. CPU 14 then waits for succeeding key operations (in step 9).

If the word read from the dictionary memory 15 is judged by the operator to be correct, the replace key 8 is depressed (in step 10). As a result, the word read out from the dictionary memory 15 is printed out by the printer 12 under the control of CPU 14 and CPU 14 waits for subsequent key operation (in step 11).

When the desired word does not correspond to the word read from the dictionary memory 15, but in fact the word entered by the character keys 5 is correct, CPU 14 instructs the printer 12 to print out the word entered by the character keys 5 if the pass key 7 is depressed (in step 12) and waits for the succeeding key operation (in step 13).

If the desired word corresponds to neither the word entered by the character keys 5, nor to the word read from the dictionary memory 15, CPU 14 waits for a subsequent character input after the correction key 9 is depressed (in step 14). The spelling of the entered word is then corrected by the character keys 5, and thereafter in response to a depression of the space key 4, CPU 14 instructs the printer 12 to print out the word whose spelling has been corrected (in step 15) and waits for an input of a new word. Accordingly, the desired sentences can be entered in the electronic typewriter 1 by repeating the above-described operations.

It is to be understood according to the present invention that the electronic typewriter 1 can also be operated in a normal typing mode. That is to say, the spelling check mode can be disabled such that when the character keys 5 are depressed (in step 1), the entered characters are successively displayed on the display 10 under the control of CPU 14 (in step 2), and at the same time are stored in the working memory 16b (in step 17). When the space key 4 is depressed (in step 18), CPU 14 reads out the series of entered characters as a single word from the working memory 16b and these entered characters are printed out by the printer 12 (in step 19). Accordingly, such key operations are repeated so that the entered words can be directly printed out without any spelling check to create a document.

In accordance with the electronic typewriter 1 of the present invention, when the spelling check mode is selected by depressing the expansion function key 6, the spelling check is performed by automatically comparing every word entered by the character keys 5 and separated by the space key 4 with all word data stored in the dictionary memory 15. If the word data whose spelling corresponds to that of the entered word exists in the dictionary memory 15, the entered word automatically printed. On the contrary, if no word data exists in the dictionary memory 15 corresponding to the entered word, an alarm sound is emitted from the buzzer 11 and simultaneously both the entered word and the word in the dictionary memory 15 most closely analogous thereto are displayed on the display 10. Printing is then easily performed by one-touch operation of either the replace key 8 or the pass key 7. If the desired word does not correspond to either word displayed on the display 10, the spelling of the displayed word must be corrected by the correction key 9 and thereafter printed out.

Although the dictionary memory 15 is installed in the electronic typewriter 1 in the previous preferred embodiment, the dictionary memory 15 may be a cartridge type detachable from the electronic typewriter 1, or may be a random access memory having a learning function. Furthermore, although the spelling comparison according to the present embodiment is performed between the entered word and the word data stored in the dictionary memory 15 in response to the depression of the space key 4, comparison can be performed in other ways. For instance, such a comparison can be performed for one line of the entered words before the printing is effected line by line by depressing the return key 22. Furthermore, the comparison may be performed between the entered words and the word data stored in the dictionary memory 15 in response to the depression of a period key or comma key.

The electronic typewriter according to the invention may omit the print key 20 and the spelling check key 21.

Referring to FIGS. 1, 2, 4 and 5 a description will now be made of a second preferred embodiment according to the invention. Although most circuit arrangements of this second embodiment are substantially the same as those of the first embodiment, the flow chart of FIG. 4 according to this second embodiment is different from that of FIG. 3. Furthermore, the working memory 16b of the first embodiment is substituted by a text memory 16a in the second embodiment. As a result, omissions are made in an explanation for circuit arrangements common to both embodiments.

Figure 4:
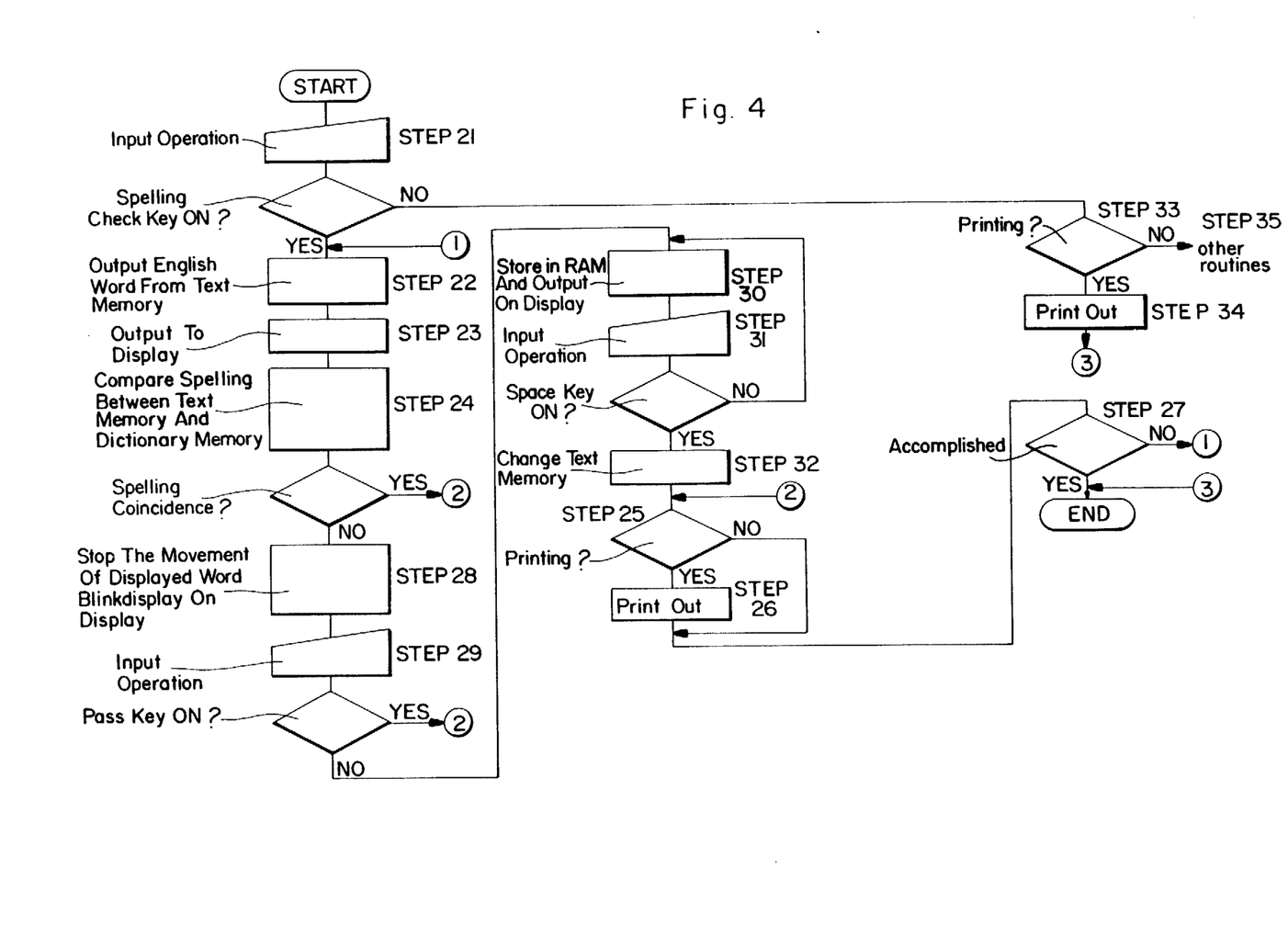
FIG. 4 is a flow chart of control operations of the electronic typewriter according to a second preferred embodiment.

The spelling check mode is effected in CPU 14 in response to an ON-signal by depressing the spelling check key 21. Every word is successively read out from the text memory 16a in the order in which the words were stored. Then, these successively read words are displayed subsequent to the word previously read out on the display 10, these displayed words being moved or swept in one direction on the display screen of the display 10.

In the spelling check mode, a single word is displayed on the display 10, and successively compared with a plurality of words stored in the dictionary memory 15 under the control of CPU 14. That is, CPU 14 judges whether the entered word exists in the dictionary memory 15 or not.

CPU 14 recognizes as a correctly spelled word the entered word when there is coincidence between the entered word and the stored word data, and thereafter judges whether the print key 20 is depressed or not.

If CPU 14 judges that the print key 20 is depressed (i.e., printing mode), then the spelling-checked entered word is printed out. As previously described, the spelling check for the words stored in the text memory 16a and the printing operation are performed at the same time under the control of CPU 14. After the printing operation is accomplished and CPU 14 judges that the print key 20 is not yet operated, CPU 14 determines whether or not there is a succeeding word. If there is a following word, it is again read out from the text memory 16a under the control of CPU 14. After the word which has been displayed on the display 10 is transferred to the left side of the screen thereof (viewed in FIG. 1), the word read out from the text memory 16a is subsequently displayed at the right side of the former word and the spelling check operation is repeated in the same manner. If CPU 14 determines that no succeeding word is stored in the text memory 16a, it terminates the spelling check operation.

When there is no word data corresponding to the entered word, CPU 14 judges it as a misspelled word and the misspelled word blinks on the display 10 so as to distinguish it from the correctly spelled word.

When the misspelled word blinks on the display 10, CPU 14 interrupts the movement or sweep of the displayed word on the screen of the display 10 and then judges whether or not the pass key 7 is depressed.

As this stage, if the pass key 7 is activated, CPU 14 recognizes the word in question as a correctly spelled one in response to the ON-signal of the pass key 7, and thereafter judges whether or not the print key 20 is activated. Then CPU 14 continues the same process of spelling check operation in the manner described previously.

If the pass key 7 is not activated and the character keys 5 are depressed to correct the misspelled word, CPU 14 recognizes that the pass key 7 is not activated and the newly entered correct character is stored in a RAM 16 in response to the ON-signal from the character keys 5, while displaying the newly entered characters on the display 10.

As the characters are entered and subsequently the space key 4 is depressed, CPU 14 judges in response to the ON-signal of the space key 4 that a series of characters which have been newly entered for correction by operating the character keys 5 correspond to a single word, and the misspelled word is replaced by the corrected word in the text memory 16a. As soon as CPU 14 replaces the misspelled word by the corrected one in the text memory 16a, it judges whether or not the print key 20 is turned on. The CPU 14 then performs subsequent processing.

CPU 14 judges whether or not the print key 20 is turned on when the spelling check key 21 is not turned on, i.e., in the non-spelling check mode. If CPU 14 judges that the print key 20 is turned on (i.e., in the print mode), the word stored in the text memory 16a is printed out. To the contrary, when the print key 20 is not yet turned on, CPU 14 executes other processing based on the control program.

Controlling operations of the electronic typewriter as arranged as above will now be described with reference to FIG. 4.

Upon switching on the power switch 1a of the electronic typewriter 1, CPU 14 is initialized. A plurality of words are previously stored in the text memory 16a by executing various key depressions such as the character keys 5 and the space key 4.

Next, the spelling check key 21 is turned on (in step 21). In responding to the ON-signal produced by the spelling check key 21, CPU 14 successively reads every word in the order of the memorized words from the text memory 16a (in step 22), and displays one of the read words on the display 10 (in step 23).

As soon as one of the words is displayed on the display 10, CPU 14 begins to compare successively the word read from the text memory 16a with the words stored in the dictionary memory 15 so as to judge whether or not the word read from the text memory 16a exists in the dictionary memory 15 (in step 24).

In this step, CPU 14 judges that the spelling of the read word is correct if the word data corresponding to the read word coincides with word data in the dictionary memory 15. Thereafter, CPU 14 judges whether or not the print key 20 is turned on (in step 25).

If CPU 14 judges that the print key 20 is turned on (i.e., in the print mode), the above-described word is printed out (in step 26). If the printed operation is accomplished and, to the contrary, the print key 20 is not turned on, CPU 14 judges whether or not there is a subsequent word (in step 27).

When CPU 14 judges that there is no succeeding word, the spelling check process is completed. Then, if CPU 14 judges that there is a succeeding word, it is read from the text memory 16a (in step 22). After the word which has been already displayed on the display 10 is moved to the left side of the display as viewed in FIG. 1, the read word is subsequently displayed at the right side of the previously displayed word (in step 23), and the subsequent processing will be continued in the same manner.

As explained in the above description, the words read out from the text memory 16a are successively moved on the screen of the display 10 toward the left side as viewed in FIG. 1, and also the spelling check for these words is carried out. Simultaneously, the printing operation is effected if the print mode is set.

If there is no coincidence between the entered word read from the text memory 16a and the word data stored in the dictionary memory 15, CPU 14 judges that the entered word corresponds to the misspelled word, the misspelled word is made to blink on the display 10 so as to distinguish words judged to be misspelled from words judged to be correct (in step 28). When the misspelled word is made to blink, CPU 14 stops the movement of the displayed word and then judges whether or not the pass key 7 is depressed.

At this moment, when the pass key 7 is depressed after the word blinking on the display 10 is confirmed (in step 29), CPU 14 judges in response to the ON-signal of the pass key 7 that the spelling of this word is correct and then judges whether or not the print key 20 is depressed (in step 25). Subsequently, the CPU 14 continues spelling check operations in the manner as described previously.

On the contrary, if the pass key 7 is not turned on and the character keys 5 are depressed to correct the misspelling of the word, CPU 14 recognizes that the pass key 7 has not yet been turned on. As a result, the word thus entered is stored in a RAM 16 in response to the ON-signal generated by operating the character keys 5 and the newly entered word is displayed on the display 10 under the control of CPU 14 (in step 30).

As previously described, when the word is entered, and subsequently the space key 4 is turned on (in step 31), CPU 14 recognizes in response to the ON-signal of the space key 4, that a series of characters which is newly entered by the depression of the character keys 5 correspond to a single word, and the misspelled word is replaced by the above corrected word in the text memory 16a under the control of CPU 14 (in step 32). Once replacement of the corrected word is executed in the text memory 16a, CPU 14 judges whether or not the print key 20 is turned on (in step 25), and thereafter performs the succeeding spelling check processes in the same manner. When the spelling check key 21 is not turned on, i.e., in the non-spelling check mode, CPU 14 judges whether or not the print key 20 is turned on (in step 33). If CPU 14 recognizes that the print key 20 is turned on, i.e., in the print mode (in step 33), the sentences stored in the text memory 16a are printed out (in step 34). On the contrary, if the print key 20 is not yet turned on, CPU 14 performs the other processing based upon the control program (step 35).

According to the present embodiment, when the word is judged to be misspelled by CPU 14, it is printed without correction if the pass key 7 is turned on. Therefore, when words such as proper nouns which are not stored in the dictionary memory 15 are judged to be misspelled and made to blink on the display 10, the electronic typewriter 1 according to the invention can directly utilize this word through the depression of the pass key 7.

While the present invention has been described using a specific embodiment, it should be understood that further modifications and changes can be made without departing from the scope of the present invention. For instance, the dictionary memory 15 can be of the cartridge type, resulting in a detachable memory for the electronic typewriter 1. In the previous embodiment, the misspelled word was blink-displayed, but instead, it is also possible to employ other displaying methods different from the blink display method. The expansion function key 6, the replace key 8 and the correction key 9 may be omitted from the keyboard 2. Moreover, in the step 8, the movement of the displayed word may be interrupted simultaneous to the termination of the printing operation of the printer 12.

What is claimed is:

1. An electronic typewriter comprising:
    a keyboard for generating signals corresponding to depressed keys, the keyboard comprising character keys for entering at least character data and a space key for separating the character data entered by the character keys into a single word;
    a dictionary memory for storing a plurality of word data corresponding to spellings of words;
    a working memory for storing said word entered from the keyboard in a single word form;
    spelling check control means for comparing the spelling of the word with the word data, which includes reading out said word from the working memory and also the word data from the dictionary memory, thereby judging whether the word data coincident with the spelling of the read word exists or not in said dictionary memory;
    a printer for printing out said word on a print paper in response to a depression of the space key; and
    output control means for interrupting the judgement of the word data performed by said spelling check control means and also the printing out by said printer in case that the spelling check control means judges that no word data coincident with the spelling of the word entered from the keyboard exists in said dictionary memory.

2. An electronic typewriter as claimed in claim 1, wherein the spelling check control means comprises acoustic output means for producing an alarm sound when the spelling check control means judges that no word data coincident with the spelling of the word entered from the keyboard exists in the dictionary memory.

3. An electronic typewriter as claimed in claim 1, wherein the spelling check control means comprises correction means for operating the printer to print out a word entered by the character keys and the space key, while replacing the word recognized as the misspelled word when it is judged that no word data coincident with the spelling of the word entered from the keyboard exists in said dictionary memory by said spelling check control means in response to depression of a correction key on the keyboard.

4. An electronic typewriter as claimed in claim 1, wherein the spelling check control means comprises pass means for releasing the printing interruption caused by said output control means in response to a depression of a pass key on the keyboard so as to recognize said word as the correctly spelled word, thereby printing out said word by the printer.

5. An electronic typewriter comprising:
  a keyboard for generating signals corresponding to depressed keys, the keyboard including character keys for entering at least character data and a space key for separating the character data entered by the character keys into a single word;
  a dictionary memory for storing a plurality of word data corresponding to spellings of words;
  a text memory for successively storing the words entered from the keyboard;
  readout means for successively reading out the words from the text memory;
  spelling check control means for comparing the spelling of the word read out by the readout means with the word data read out from the dictionary memory thereby judging whether the word data coincident with the spelling of the read data exist or not in said dictionary memory;
  a printer for printing out the character data entered from the keyboard;
  a displaying means for displaying the character data entered from the keyboard; and
  output control means for interrupting the judgment of the word data performed by the spelling check control means in case that the spelling check control means judges that no word data exists coincident with the spelling of the word read out from the text memory, and for displaying said word on the displaying means, said output control means comprising:
  movement displaying means for successively displaying the word with movement read out by said readout means, and
  display interruption means for interrupting a movement display of the word when the spelling check control means judges that there is no word data coincident with the spelling of the displayed word, said display interruption being continued for displaying such a word whose spelling is not coincident with the word data.

6. An electronic typewriter as claimed in claim 5, wherein said output control means comprises special displaying means for specially displaying a mis-spelt word under the control of the spelling check control means when the spelling check control means judges that there is no word data coincident with the spelling of said word.

7. An electronic typewriter as claimed in claim 6, wherein said printer comprises printing control means for successively printing out the words read out by said readout means.

8. An electronic typewriter as claimed in claim 7, wherein said printing control means comprises printing interruption means for interrupting the printing operation when said spelling check control means judges that there is no word data coincident with the spelling of said word read out by said readout means.

9. An electronic typewriter as claimed in claim 8, wherein the spelling check control means comprises designation means for designating whether or not the printing operation by the printing control means or the movement display by the movement displaying means is performed in conjunction with the word data judgement that no word data coincident with the spelling of the word entered from the keyboard exists in said dictionary memory.

10. An electronic typewriter as claimed in claim 8, wherein the spelling check control means comprises correction means for displaying on the displaying means the word entered by the character keys and the space key, for operating the printer to print out the word, and for storing the word in the text memory, while replacing the word which is recognized as the misspelled word by said spelling check control means.

11. An electronic typewriter as claimed in claim 8, wherein the spelling check control means comprises pass means for releasing the movement display interruption caused by said display interruption means and the printing interruption caused by the printing interruption means in response to a depression of a pass key so as to recognize said word as the correctly spelled word, thereby continuing the movement display on the displaying means and also the printing operation by the printer.

* * * * *